Patented Feb. 24, 1931

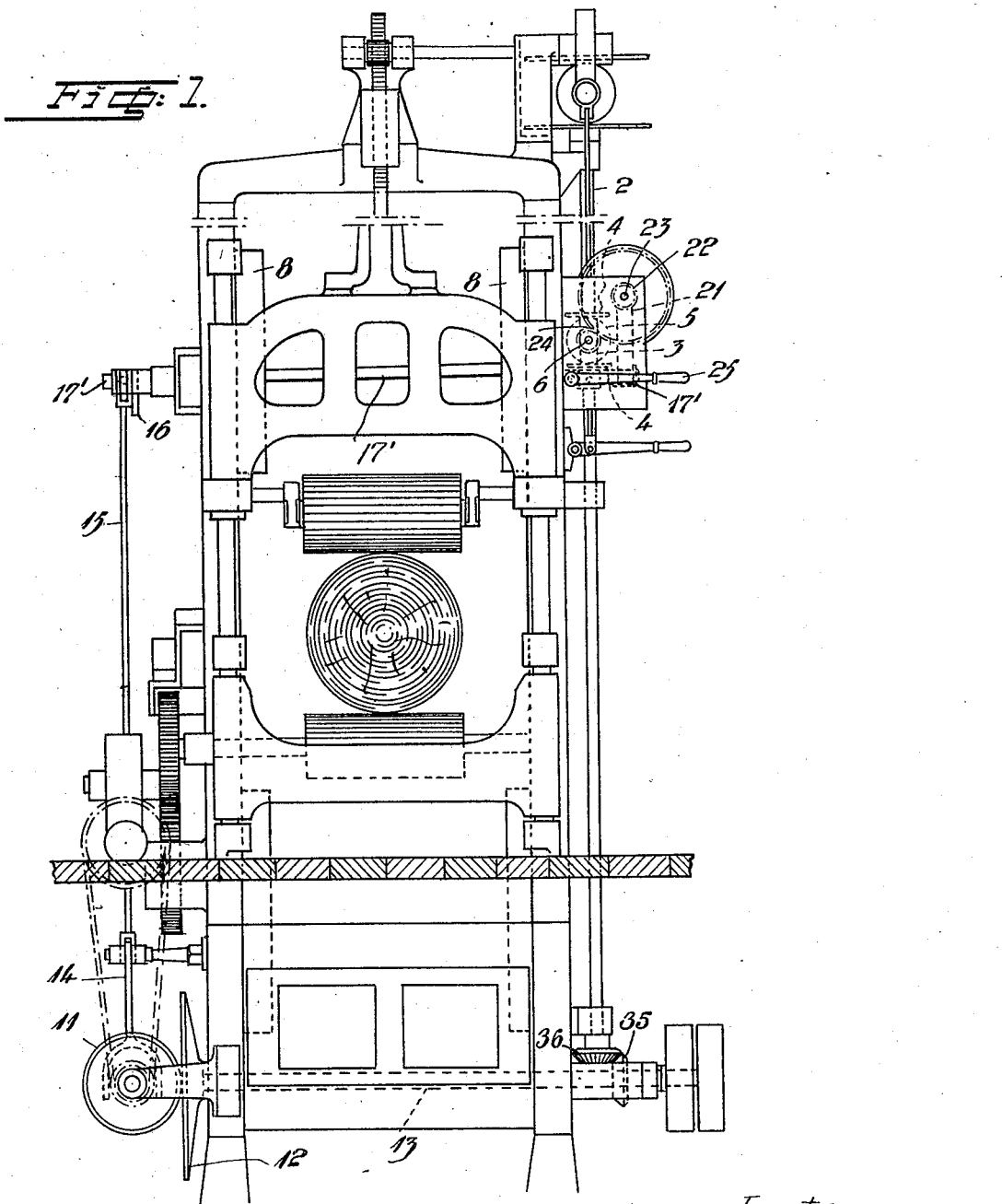

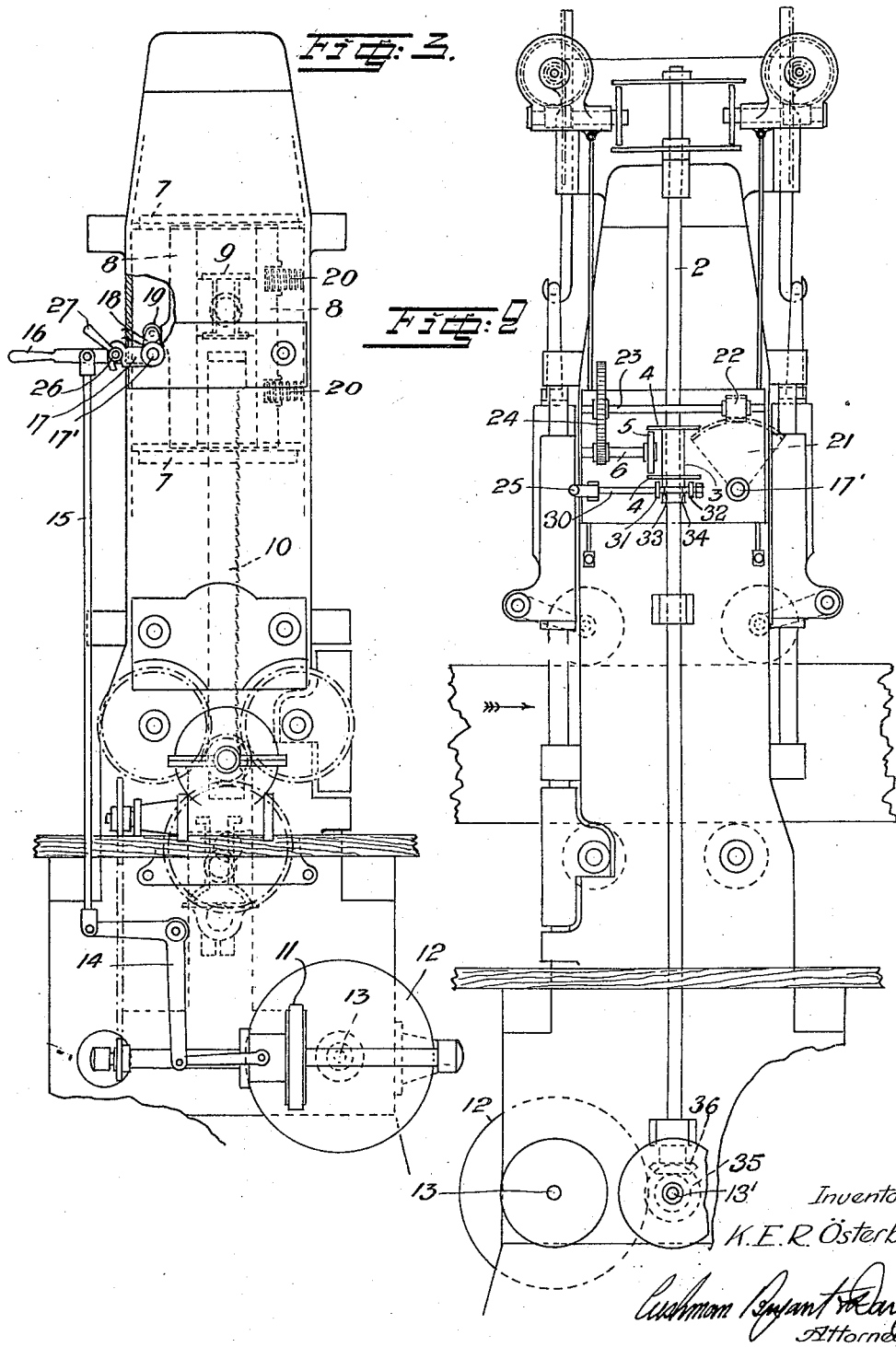

1,794,352

UNITED STATES PATENT OFFICE

KARL ERIK RUDOLF ÖSTERBERG, OF STOCKHOLM, SWEDEN, ASSIGNOR TO J. & C. G. BOLINDERS MEKANISKA VERKSTADS AKTIEBOLAG, OF STOCKHOLM, SWEDEN, A JOINT-STOCK COMPANY

SAWING-MACHINE FRAME

Application filed June 3, 1930, Serial No. 459,094, and in Sweden November 9, 1929.

The present invention refers to an arrangement in sawing machine frames and has for its object to provide for quick adjustment, without fatiguing physical labor, of the saw frame to secure the proper blade angle and of the feed roller drive to secure the proper rate of feed, according to the varying size of the logs introduced into the sawing machine. Hitherto, said adjustment has been effected manually, which has been found to be fatiguing and time-wasting, particularly when logs of considerably varying sizes are introduced alternately into the sawing machine, as is frequently the case. Adjustment must then be effected for each log and must be repeated perhaps hundreds of times daily. By the arrangement now provided according to the present invention adjustment may, on the other hand, be effected with the aid of mechanical power, only a minimum of manual power being required to bring said mechanical power into operation.

The invention is principally characterized by the fact that the adjustable gearing at the saw frame, which determines the rate of feed, as well as the likewise adjustable guiding means provided for the blade frame, which determines the inclination of the blades, that is to say the overhang of the blades, are connected through a suitable coupling device with a power transmitting means at the saw frame, in such a manner that, when the power transmitting means is thrown in, adjustment of the two first-mentioned arrangements will be effected.

The accompanying drawing illustrates by way of example an embodiment of the invention. Fig. 1 shows a saw frame arranged in accordance with the invention as viewed in the longitudinal direction of the sawn log, and Figs. 2 and 3 show two opposed side elevations of the saw frame.

Mounted in the frame 1 of the saw frame is a countershaft 2 carrying a sleeve 3 which is displaceable but not rotatable thereon, said sleeve being provided with two plane friction disks 4. Arranged between these friction disks is a friction disk 5 secured on the shaft 6. The sleeve 3 together with the friction disks 4 may be displaced on the shaft 2 by means of the lever 25, whereby either one of the friction disks 4 is brought into cooperation with the friction disk 5, so that the same is driven in the one or the other direction. Lever 25 is fixed to a rock shaft 30 provided with parallel arms 31 and 32 having pins 33 and 34 engaged in a circumferential groove of sleeve 3. Horizontal guides 7 carry the upper vertical guide frames 8 for the blade frame 9. By displacing the latter vertical guides on the horizontal guides 7 the blade frame 9 and its blades 10 are caused to assume an inclined position corresponding to the rate of feed of the log operated on. This rate is determined by the position which the friction disk 11 takes on a plane friction disk 12 secured on the driven or power shaft 13. Through the bell crank lever 14, the link rod 15 and the arms 16 and 17, the friction disk 11 is in connection with a rock shaft 17′ carrying the arms 16 and 17. Projecting from the latter shaft are cam arms 18, one opposite each pair of guides 8, against the one side of which slide rollers 19 at the arms 18 are caused to bear. Acting on the side of the guide pairs 8 opposite to that of the rollers 19 are springs 20 or weights which keep the guide frames 8 bearing on the slide rollers 19. Secured on the shaft 17 is a screw segment 21 cooperating with the worm 22 secured on the shaft 23, which receives movement from the friction disk 5 through the toothed gearing 24. Countershaft 2 is continuously driven during operation of the machine from a power shaft 13′ through bevel gears 35 and 36.

When adjustment of the rate of feed and the inclination of the blades is to be effected, the lever 25 is actuated in an upward or downward direction, the friction disk 5 being then driven in the one or the other direction, as hereinbefore described. This results in the shaft 17 being turned in the one or the other direction, the said shaft then transmitting an adjusting movement to the feeding mechanism through the arms 16 and 17 and at the same time an adjusting movement to the upper vertical guides of the blade frame through the arms 18.

As will be seen from Fig. 3, the arms 16 and 17 are normally locked together by means of a bolt 26 embraced by the hook-shaped arm 17. The bolt 26 is threaded and provided with a clamping nut adapted to be tightened up by means of a handle 27 projecting therefrom. The latter arrangement has for its purpose to facilitate releasing of the arms 16 and 17 from each other, so that the arm 16 is rendered free to be turned manually, independently of the arm 17. The last-mentioned turning movement may then take place so far that the friction disk 11 is moved over the friction disk 12 to the opposite side of the center thereof, so that back-feeding is effected, as required in certain cases.

What I claim is:—

1. In a machine of the class described, an upright main frame, a horizontal feed roller on said frame, a guide frame on the main frame adjustable horizontally relative thereto, power driven means on the main frame, drive connections between said power driven means and feed roller including speed changing mechanisms, means operable to adjust said guide frame, and controllable means driven from said power driven means for effecting adjustment of the speed changing mechanism and for operating the guide frame adjusting means.

2. In a machine of the class described, an upright main frame, a horizontal feed roller on said frame, a guide frame on the main frame adjustable horizontally relative thereto, power driven means on the main frame, drive connections between said power driven means and feed roller including speed changing mechanisms, means operable to adjust said guide frame, and controllable means driven from said power driven means for effecting adjustment of the speed changing mechanism and for operating the guide frame adjusting means, said controllable means including a pair of spaced driving friction disks and a driven friction disk between the driving disks, the driving disks and driven disk being selectively engageable to effect rotation of the latter in either direction.

3. In a machine of the class described, an upright main frame, a horizontal feed roller on said frame, a guide frame on the main frame adjustable horizontally relative thereto, power driven means on the main frame, drive connections between said power driven means and feed roller including speed changing mechanism, a countershaft driven from said power driven means, means operable to adjust said guide frame, and controllable means driven by said countershaft for effecting adjustment of the speed changing mechanism and for operating the guide frame adjusting means.

4. In a machine of the class described, an upright main frame, a horizontal feed roller on said frame, a guide frame on the main frame adjustable horizontally relative thereto, power driven means on the main frame, drive connections between said power driven means and feed roller including speed changing mechanism, a countershaft driven from said power driven means, means operable to adjust said guide frame, and controllable means driven by said countershaft for effecting adjustment of the speed changing mechanism and for operating the guide frame adjusting means, said controllable means including a pair of spaced driving friction disks and a driven friction disk between the driving disks, the driving disks and driven disk being selectively engageable to effect rotation of the latter in either direction.

5. In a machine of the class described, an upright main frame, a horizontal feed roller on said frame, a guide frame on the main frame adjustable horizontally relative thereto, power driven means on the main frame, drive connections between said power driven means and feed roller including speed changing mechanism, a rock shaft adjacent said guide frame operable to adjust the latter, and means driven from said power driven means to operate said rock shaft in either direction and simultaneously to adjust said speed changing mechanism.

6. In a machine of the class described, an upright main frame, a horizontal feed roller on said frame, a guide frame on the main frame adjustable horizontally relative thereto, power driven means on the main frame, drive connections between said power driven means and feed roller including speed changing mechanism, a rock shaft adjacent said guide frame operable to adjust the latter, and means driven from said power driven means to operate said rock shaft in either direction and simultaneously to adjust said speed changing mechanism, said means including a constantly rotating countershaft and reversible friction gearing having drive elements mounted on said countershaft.

7. In a machine of the class described, an upright main frame, a horizontal feed roller on said frame, a guide frame on the main frame adjustable horizontally relative thereto, power driven means on the main frame, drive connections between said power driven means and feed roller including speed changing mechanism, a rock shaft adjacent said guide frame operable to adjust the latter, and means driven from said power driven means to operate said rock shaft in either direction and simultaneously to adjust said speed changing mechanism, said means including a constantly rotating vertically extending countershaft and reversible friction gearing having drive elements mounted on said countershaft.

8. In a machine of the class described, an upright main frame, a horizontal feed roller on said frame, a guide frame on the main frame adjustable horizontally relative thereto, power driven means on the main frame, drive connections between said power driven means and feed roller including speed changing mechanism, a rock shaft adjacent said guide frame operable to adjust the latter, means driven from said power driven means to operate said rock shaft in either direction, and means operated by the rock shaft to adjust said speed changing mechanism.

9. In a machine of the class described, an upright main frame, a horizontal feed roller on said frame, a guide frame on the main frame adjustable horizontally relative thereto, power driven means on the main frame, drive connections between said power driven means and feed roller, including speed changing mechanism, a rock shaft adjacent said guide frame operable to adjust the latter, means driven from said power driven means to operate said rock shaft in either direction, a lever pivoted on said rock shaft and manually swingable relative thereto, and operating connections between said lever and speed changing mechanism for adjusting the latter.

10. In a machine of the class described, an upright main frame, a horizontal feed roller on said frame, a guide frame on the main frame adjustable horizontally relative thereto, power driven means on the main frame, drive connections between said power driven means and feed roller, including speed changing mechanism, a rock shaft adjacent said guide frame operable to adjust the latter, means driven from said power driven means to operate said rock shaft in either direction, a lever pivoted on said rock shaft and manually swingable relative thereto, operating connections between said lever and speed changing mechanism for adjusting the latter, and means for securing said lever to said rock shaft for operation by the latter.

11. In a machine of the class described, an upright main frame, a horizontal feed roller on said frame, a guide frame on the main frame adjustable horizontally relative thereto, power driven means on the main frame, drive connections between said power driven means and feed roller including speed changing mechanism, a rock shaft adjacent said guide frame operable to adjust the latter, means driven from said power driven means to operate said rock shaft in either direction, a lever pivoted on said rock shaft and manually swingable relative thereto, operating connections between said lever and speed changing mechanism for adjusting the latter, an arm fixed on said rock shaft adjacent said lever, and means for connecting said lever with said arm for oscillation therewith.

12. In a machine of the class described, an upright main frame, a horizontal feed roller on said frame, a guide frame on the main frame adjustable horizontally relative thereto, power driven means on the main frame, drive connections between said power driven means and feed roller including speed changing mechanism, a countershaft continuously driven from said power driven means, a pair of spaced friction driving disks on said countershaft, a friction driven disk selectively engageable with said driving disks for rotation thereby in either direction, a rock shaft adjacent said guide frame, cam means on said rock shaft engaging said guide frame to adjust the same upon operation of the rock shaft, driving connections between said driven disk and said rock shaft, and adjusting means for said speed changing mechanism drivable by said rock shaft.

13. In a machine of the class described, an upright main frame, a horizontal feed roller on said frame, a guide frame on the main frame adjustable horizontally relative thereto, power driven means on the main frame, drive connections between said power driven means and feed roller including speed changing mechanism, a countershaft continuously driven from said power driven means, a pair of spaced friction driving disks on said countershaft, a friction driven disk selectively engageable with said driving disks for rotation thereby in either direction, a rock shaft adjacent said guide frame, cam means on said rock shaft engaging said guide frame, to adjust the same in one direction upon operation of the rock shaft, yieldable means for moving said guide frame in the opposite direction, driving connections between said driven disk and said rock shaft, and adjusting means for said speed changing mechanism drivable by said rock shaft.

14. In a machine of the class described, an upright main frame, a guide frame adjustable horizontally on the main frame, a rock shaft on the main frame adjacent the guide frame, cam means on said rock shaft bearing against the guide frame to adjust the latter in one direction, and yieldable means for moving the guide frame in the opposite direction.

15. In a machine of the class described, an upright main frame, a guide frame adjustable horizontally on the main frame, a rock shaft on the main frame adjacent the guide frame, cam means on said rock shaft bearing against the guide frame to adjust the latter in one direction, and a spring interposed between the two frames for moving the guide frame in the opposite direction.

KARL ERIK RUDOLF ÖSTERBERG.